United States Patent
Brosens

[11] 3,753,106
[45] Aug. 14, 1973

[54] SYSTEM AND METHOD FOR DYNAMIC CONTROL OF ELECTRICAL ROTARY DEVICES

[75] Inventor: Pierre J. Brosens, Belmont, Mass.
[73] Assignee: General Scanning, Inc., Watertown, Mass.
[22] Filed: Feb. 25, 1971
[21] Appl. No.: 118,640

[52] U.S. Cl..................... 324/125, 73/430, 318/696
[51] Int. Cl............................................. G01r 1/14
[58] Field of Search...................... 324/125; 310/49; 318/138, 685, 696; 73/430

[56] References Cited
UNITED STATES PATENTS

| | | | |
|---|---|---|---|
| 3,345,547 | 10/1967 | Dunne | 310/49 R |
| 3,327,191 | 6/1967 | Goto | 318/138 |
| 3,386,018 | 5/1968 | Smith-Vaniz | 318/138 |
| 3,465,225 | 9/1969 | O'Regan et al. | 310/49 R |
| 3,466,520 | 9/1969 | Aylikci et al. | 318/138 |

Primary Examiner—Rudolph V. Rolinec
Assistant Examiner—Ernest F. Karlsen
Attorney—Williams, John N.

[57] ABSTRACT

A method and system for obtaining precise step-wise motion in an electrical rotary device such as a moving-iron galvanometer, a stepping motor or other electrical device having a linear rotating response controllable by applied electrical pulses. Motion of the device is arrested exactly at the points desired by breaking down the actuating step into a sequence of two steps, the first being applied as the motion-initiating step, and the second being applied at the time of peak overshoot resulting from the first step. The second pulse is of a magnitude to exactly terminate motion at a half-period of resonant oscillation of the system.

Signal-conditioning circuits for programming the sequence or time of application of the pulses and their amplitude include a storage circuit, an averaging circuit and a timing circuit to control the application of the sequence pulse.

6 Claims, 4 Drawing Figures

INVENTOR
PIERRE J. BROSENS

SYSTEM AND METHOD FOR DYNAMIC CONTROL OF ELECTRICAL ROTARY DEVICES

BACKGROUND OF THE INVENTION

Although, as noted above, the present invention is useful in connection with any rotating electrical device which responds linearly in motion controllable by applied pulses, it may probably best be understood by considering it as embodied in a moving-iron galvanometer. Such a device is disclosed in the optical scanner which is a key element of the invention which constitutes the subject matter of the co-pending application of Jean I. Montagu, entitled "Actuator", Ser. No. 879,411 filed Nov. 24, 1969 and assigned to the same assignee as is the present application. Optical scanners of the type of interest here generally include a mirror mounted for limited rotation upon an output shaft driven by or forming a part of the armature of a moving-iron galvanometer. The armature is usually of high-permeability material and is mounted between two poles, at least one of which is preferably split into two spaced pole pieces. Biasing flux through the armature is derived between pairs of pole pieces from a permanent magnet. Control flux through the armature along different paths is provided between different pairs of pole pieces by one or more control coils. These scanners are useful in a variety of applications such as optical character recognition, facsimile transmission, photographic type-setting, infra red scanning, TV projection and various other applications. In fact, the devices are useful wherever limited rotation of an element in response to an electrical current over a large band width and with a high degree of accuracy is needed. They may easily be adapted for sinusoidal, ramp, sawtooth, triangular wave or step scanning over a wide range of repetition rates.

Despite the general acceptance of moving-iron galvanometer scanning devices, they, as electromechanical devices, have been considered unsuitable for some high speed applications. It has been the practice to obtain high-resolution scanning with face-plate cathode ray tubes, stepper motors, and rotating prisms. However, all of these expedients tend to be objectionable because of their high cost. Too, the light output of cathode ray tubes is limited in intensity, and a function of interest such as the deflection of high power laser beams cannot be provided. Stepper motors and rotating prisms are frequently difficult to control and, also, backlash problems arise when gearing is necessary. The present invention is concerned with, and has for its major object, the improvement of rotary electrical devices to the point that they may be used in a variety of high speed applications.

A major limitation on range of usefulness of electro-mechanical devices, and particularly, moving-iron galvanometer scanners, stems from the fact that inertia prevents the instantaneous stopping of motion when the scanner must move from one position to another position quickly and accurately. Although this requirement is common to many scanning applications, it is well illustrated, for example, in a conventional television receiver where vertical scanning may be at the rate of 30 or 60 frames per second, but retrace fly-back to assume a new step-position must take place in only about 1.5 milliseconds. Such scanning combined with accurate and synchronized retrace at high speed has been attainable only with elaborate and costly rotating prism systems.

SUMMARY OF THE INVENTION

As noted above, the invention is not limited to moving-iron galvanometers nor to any particular application of such galvanometers. In any electrical rotary device where control of the dynamic response is needed, whether it be for use in television, data processing or the like, the present invention is of value. Precision stepping of the device is obtained by modifying the step-command signal applied to the control coil of the device. The conventional signal is converted or broken down into a sequence of two step pulses. The second pulse is of such magnitude that the residual motion of the galvanometer is arrested precisely when it reaches a desired position stepped from an initial position. It is conventional to apply a pulse in the form of a step change in coil current to the rotary device, as would be the case in the application of a step-command to a scanning galvanometer, for example. The motion of the armature in such circumstances will decay exponentially in amplitude. The decaying motion will be oscillatory if the damping is below-critical, and the amplitude will decay in proportion to:

$$e^{-\zeta \omega t} \qquad 0 < \zeta \leq 1$$

where $\zeta$ is the damping ratio, $\omega$ is the undamped natural angular frequency in radians per second and $t$ is the time.

When the damping is over-critical, and the motion is non-oscillatory, the amplitude decays approximately in proportion to:

$$e^{-(\omega t/2\zeta)} \qquad \zeta > 1$$

The fastest decay in amplitude is theoretically achieved with critical damping i.e., $\zeta = 1$, and the amplitude at the end of one period of undamped oscillation, $T = (2\pi/\omega)$, is 1.4 percent of the step amplitude. The member of periods required to reach 1.4 percent of the step amplitude at other values of damping may be computed by standard methods, yielding the approximations:

Number of periods $= 0.68/\zeta + 0.32\zeta^2 \qquad \zeta < 1$
Number of periods $= 1.35\zeta - 0.35/\zeta^2 \qquad \zeta > 1$ In a conventional moving-iron galvanometer device having an open coil, damping is usually less than critical damping. The amplification factor, (Q), namely, the ratio of amplitude at the frequency of maximum amplitude to the amplitude attained with the same input current at zero frequency is of the order of 2. Because the damping ratio $\zeta$ is $1/2Q$, the damping ratio $\zeta$ has a value, normally, of no greater than 0.25, and with such damping, the time required to reach 1.4 percent of the step amplitude is about 3 whole periods. Taking a natural frequency for the device, such as 800 HZ, one finds the elapsed time to be approximately 4 milliseconds, which is not fast enough for vertical scanning in a television system, and certainly not fast enough for other applications such as those involving high speed data processors.

In the present invention, the preferred solution involves applying the actuating signal in a sequence of two steps. In the vertical television scanning example which is used as a typical application, that signal is the retrace input signal.

The desired effects are obtained by using a signal-conditioning circuit to which the actuating pulse is applied simultaneously with a trigger signal, preferably generated by the actuating pulse. In the signal-conditioning circuit, the actuating pulse is scaled down by a constant factor with the help of a capacitor, which stores the signal level before the pulse, and of a dividing resistor network, to produce a motion-initiating pulse which is applied to the control coil of the galvanometer. After a predetermined period, the scaling-down of the actuating pulse is terminated, so that the full value of the actuating pulse becomes applied to the control coil of the galvanometer.

For a better understanding of the present invention, its objects, features and advantages, reference should be made to the following detailed description of a preferred embodiment of the invention in which.

Figure 1:
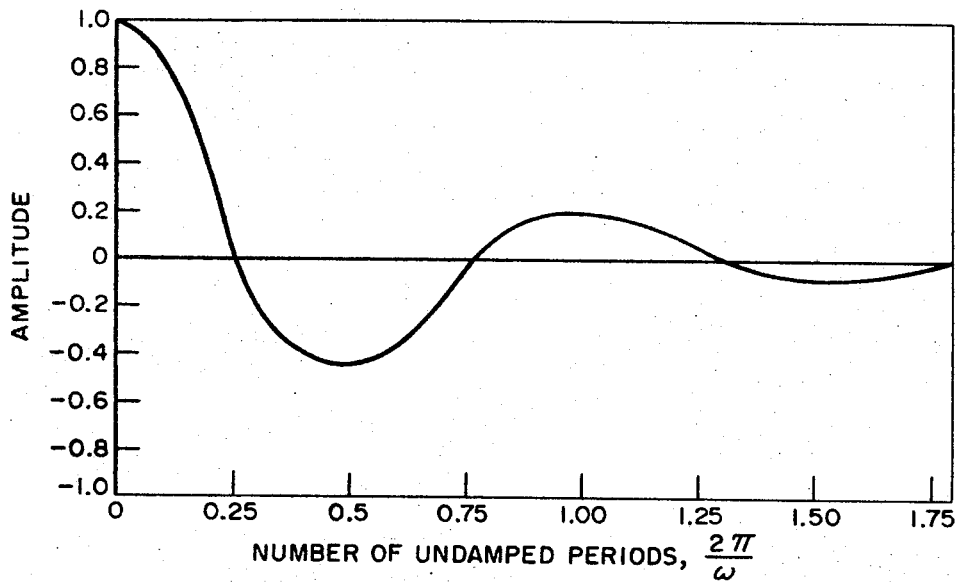
FIG. 1 is a graph of the step-response of a moving-iron galvanometer with 25 percent of critical damping.

In FIG. 1, the motion of a galvanometer armature of a typical system in response to a conventional step-command is shown graphically. In fact, the same response would be had with any single-degree-of-freedom rotary electrical device when damping is about 25 percent of the critical value. Such rotary devices behave as second-order systems with an amount of resonance which varies with the degree of damping of the device. The amount of resonance magnification, (Q), may run from approximately 1 to 20. Such resonance is considered detrimental to the normal operation of stepping devices because rapid movement from one stationary position to another is generally required. Similarly, in situations where constant velocity with a fast retrace is needed, resonance is equally undesirable because it leads to overshoots and ringing.

With the existence of damping of 25 percent, as in FIG. 1, the final equilibrium position, which is the position at which it is desired to arrest the motion of the device, is the neutral central line marked 0. The first crossing of that position takes place as the armature overshoots at almost exactly one-quarter of a period after the initiation of motion. About one-half period after the initiation of motion, motion stops momentarily with the device at an overshoot position of −0.44 or 44 percent. Three-quarters of a period after the start of motion, a second crossing of the final equilibrium position or neutral 0 line occurs.

Expressed mathematically, the overshoot near $t=T/2$, where T is the period of damped oscillation of the galvanometer, is given exactly by:

$$x = e^{-(\pi \zeta / \sqrt{1-\zeta^2})} \quad \zeta < 1$$

Its time of occurrence is:

$$t = \pi/\omega \sqrt{1-\zeta^2} \quad \zeta > 1$$

where $\zeta$ is the damping ratio, $\omega$ is the undamped natural angular frequency, and $t$ is the time.

Figure 2A:
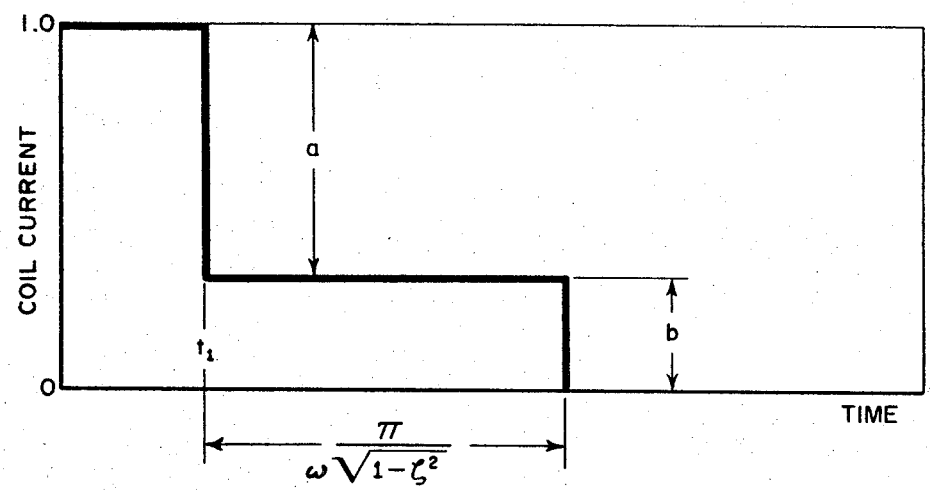
FIG. 2A is a time chart of current flow in the coil of the galvanometer during the application of sequenced pulses.

In FIG. 2A, coil current through the control coil of the rotary electrical device is plotted along the ordinate, and time is plotted along the abscissa. If it be assumed that the rotary device is at the end of a scanning motion at time 0 with full or unity current flowing in the coil, and it is desired to reset the device precisely at an equilibrium position to commence another scanning motion, conventional practice would be simple to abruptly discontinue the flow of current producing, in effect, a negative pulse. The galvanometer motion would be as indicated by the curve of FIG. 1.

However, by applying a fraction of the desired step-command pulse at the time $t_1$, which is the time at which the conventional pulse would be applied, and the remainder of the desired step at the time $t_1 + (\pi/\omega \sqrt{1-\zeta^2})$, a different result is obtained. The amplitude of the first step is: $a = 1/(1+x)$, and that of the second step is: $b = x/(1+x)$.

Figure 2B:
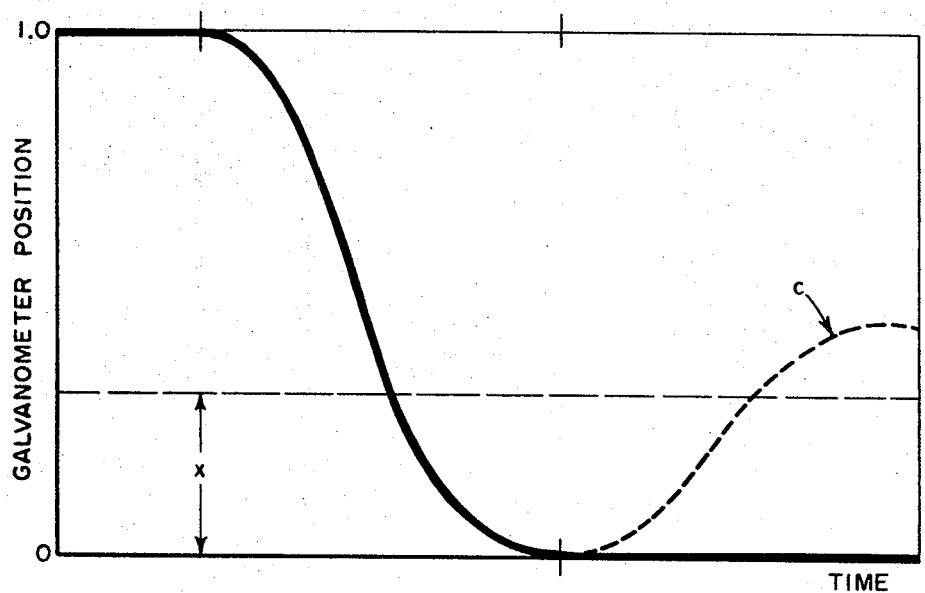
FIG. 2B is a time chart on the same base as FIG. 2A of galvanometer armature position during the application of sequenced pulses.

Instead of following a curved line similar to that of FIG. 1, or the combined full and dashed lines of FIG. 2B, the motion of the galvanometer is made to cease at the end of the full line at the zero level, because the second pulse is applied precisely when the armature position is at 0, the desired new position. At that point, the tendency of the device to swing back from the maximum overshoot is exactly cancelled by the second step of the pulse. In other words, by choosing the proper ratio of amplitudes of the two steps of the pulse, the final position can be a desired one achieved in half a period, which for a galvanometer with 2,000 Hz resonance corresponds to 250 microseconds.

The foregoing analysis is concerned with step-response, but similar techniques may be used in sawtooth scanning. In that situation, neither the initial velocity nor the desired final velocity of the scanner is zero. However, similar sequenced step pulses may be utilized if the duration of the step is calculated to include the time required for the scanner to decelerate and reverse direction at the start of retrace as well as the time required to pick up speed at the end of retrace.

Scanning efficiency, which may be defined as the percentage of the time during which constant velocity scanning takes place, can be as high as 40 percent of the natural frequency of the galvanometer. For example, it may be 800 Hz with a scanner having a natural frequency of 2,000 Hz.

Although the foregoing analysis is theoretical in that it is assumed that the coil current in the moving-iron galvanometer may be changed instantaneously, there are, of course, inductive effects which limit the rate of current build-up in the coils. Nevertheless, with simple driver amplifiers, that rate can be made effectively instantaneous.

Figure 3:
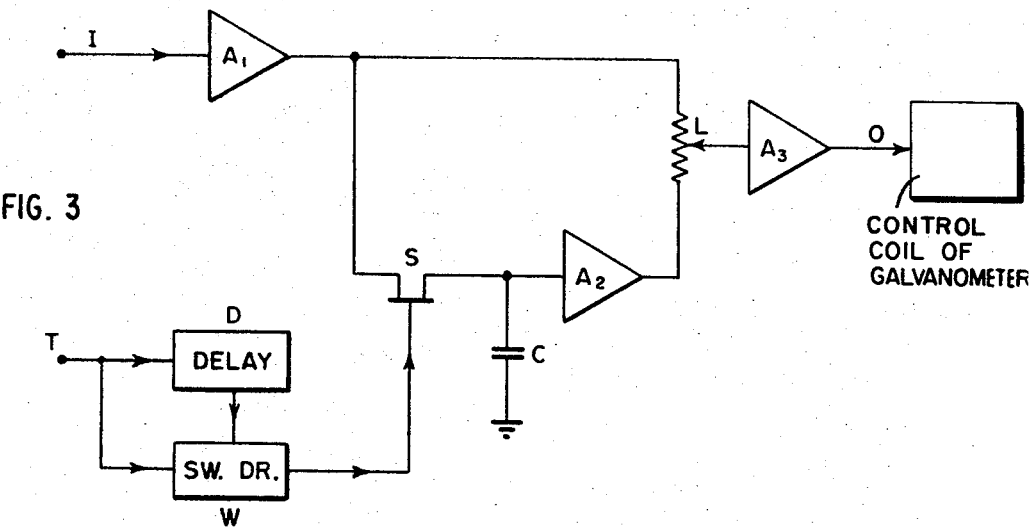
FIG. 3 is a schematic circuit diagram of a signal-conditioning circuit.

In FIG. 3, a suitable electronic circuit for conditioning the signal applied to the control coil of the galvanometer is shown. An input terminal I is connected through a drive amplifier $A_1$, to one end of a potentiometer L and also to a normally closed, conductive, switch S. The potentiometer L has an adjustable tap connected through a drive amplifier $A_3$ to an output terminal 0. The switch S is connected to a capacitor C and a drive amplifier $A_2$ which in turn is connected to the other end of the potentiometer L. Thus, under normal circumstances, the voltage present at the input terminal I appears at the output terminal 0 and on the capacitor C. Operation of the switch S is effected by a switch drive W which is controlled by an input trigger applied at the terminal T and by an adjustable delay circuit D.

When a step-change occurs at I, however, a trigger signal, preferably generated by the step-change at I by, for example, a differentiating circuit, is applied at the terminal T. The trigger signal energizes the delay circuit D and simultaneously triggers the switch drive W to cause immediate opening of the switch S. The switch S remains open, non-conducting, for a length of time determined by the adjustment of the delay circuit D, and the capacitor C retains its charge which, of course, is at the valve of the input signal as it was prior to the step-change. Time constants of the circuit are such that so long as the switch is closed, conducting, the charge on the capacitor C follows the value of the input signal.

However, for a length of time which is set in the delay circuit D to be equal to one-half the period of oscillation of the galvanometer being controlled, the switch S remains open, non-conducting. During this time the potentiometer L averages the value of the signal at I with the value of the signal at I as it was prior to the step-change, that pre-existing value being represented by the stored charge on the capacitor C.

At the end of the time of delay, the switch drive W is deactivated by the delay circuit D, and the switch recloses to restore the entire signal-conditioning circuit to its normal state.

What has been disclosed is a specific example of a method and system for controlling the dynamic response of a rotary electrical device to applied step changes in the drive signal. However, as noted above, the invention has application in a broad range of systems where it is necessary or desirable to bring a rotary electrical device rapidly to a precise position displaced from another position previously assumed by the device.

What is claimed is:

1. The method of controlling the dynamic response to a step-change in input signal of a limited rotation device having a control coil and a damping ratio less than unity, said device being linearly responsive to variable magnitude step-changes in said input signal, said method comprising the steps of generating and applying a fraction of said step-change in input signal to said control coil at a given time $t$ and generating and applying in addition the remainder of said step-change in input signal to said control coil at a time substantially equal to $t + (\pi/\omega \sqrt{1 - \zeta^2})$, where said fraction is substantially equal to $1/(1+x)$ of said step-change, $x$ is approximately equal to the peak overshoot of said limited rotation device, $\omega$ is the undamped natural angular frequency of said limited rotation device and $\zeta$ is the damping ratio.

2. The method defined in claim 1 wherein the amplitude of said first fraction is substantially equal to $1/(1 + X)$ and the amplitude of said second fraction is substantially equal to $X/(1 + X)$ where X is approximately equal to the peak overshoot of said rotary electrical device.

3. The method of controlling the dynamic response to a step-change in input signal of a limited rotation device having a control coil and a damping ratio less than unity, said device being linearly responsive to variable magnitude step-changes in input signal, said step-change of a magnitude sufficient if abruptly applied to cause rotation of said device to, and decaying oscillation of said device about, a predetermined point, said method comprising the steps of generating said step-change in input signal as a sequence of two component steps, the first component step being equal to a fraction of said step-change sufficient to cause rotation of said device to a position of maximum overshoot at said predetermined point, and the second component step being equal to the remainder of said step-change, applying said first component step to said coil at a given time and following a duration approximately equal to half a period of the undamped natural oscillation of said device applying in addition the second component step to said coil.

4. A signal-conditioning circuit for controlling the dynamic response of a linearly responsive limited rotation device having a control coil responsive to a step-change in input signal comprising means for normally applying said input signal to said control coil, continually updatable storing means for normally receiving said input signal, means responsive to a step-change in said input signal to set said storing means with the input signal valve preceding said step-change, means for averaging the output of said storing means and said step-changed signal, said averaging means set to produce an output equal to the total of said stored signal and a fraction of said step-change, said fraction being substantially equal to $1/(1 + X)$, where X is approximately equal to the peak overshoot of said device, means for applying said averaged output to said control coil, and means for establishing the full step-changed input signal at said control coil after a period of time approximately equal to half a period of the undamped natural oscillation of said device.

5. A signal-conditioning circuit as defined in claim 4 wherein said means for normally storing said input signal comprises a capacitor and resistance network having a time constant permitting storage of said input signal, said means responsive to a step-change in said input signal comprises a switch-drive and switch, said capacitor being normally connected to receive said input signal through said switch, said switch-drive being responsive to step-change to open said switch, stored charge on said capacitor being applied with said step-change to said control coil upon opening of said switch.

6. A limited rotation electrical device in combination with a circuit for conditioning a step-change in input signal for application to control coil means of said limited rotation device, said device being linearly responsive to variable magnitude step-changes in input signal, comprising means for generating a fraction of said step-change in input signal, said fraction being substantially equal to $1/(1 + X)$ of said step-change, means for applying said fractional step-change to said control coil means at a given time t, means for generating the remainder of said step-change in input signal, and means for applying in addition said remainder to said control coil means at a time substantially equal to $t + (\pi/\omega \sqrt{1- \zeta^2})$, where $x$ is approximately equal to the peak overshoot of said device, $\omega$ is the undamped natural angular frequency of said device and $\zeta$ is the damping ratio.

* * * * *